United States Patent
Crean et al.

(10) Patent No.: US 7,237,818 B2
(45) Date of Patent: Jul. 3, 2007

(54) SLIDE-OUT MECHANISM FOR RECREATIONAL VEHICLES

(75) Inventors: Johnnie R. Crean, Chino, CA (US); Ron Brown, Ontario, CA (US)

(73) Assignee: Alfa Leisure, Inc., Ontario, CA (US)

( * ) Notice: Subject to any disclaimer, the term of this patent is extended or adjusted under 35 U.S.C. 154(b) by 0 days.

(21) Appl. No.: 11/336,412

(22) Filed: Jan. 19, 2006

(65) Prior Publication Data

US 2006/0267363 A1 Nov. 30, 2006

Related U.S. Application Data

(60) Provisional application No. 60/645,145, filed on Jan. 19, 2005.

(51) Int. Cl.
*B60P 3/34* (2006.01)

(52) U.S. Cl. .................. 296/26.13; 296/26.01

(58) Field of Classification Search ............. 296/26.13, 296/26.01, 26.12, 26.09; 52/67
See application file for complete search history.

(56) References Cited

U.S. PATENT DOCUMENTS

| | | | | |
|---|---|---|---|---|
| 5,706,612 | A * | 1/1998 | Tillett .......................... | 296/171 |
| 5,758,918 | A * | 6/1998 | Schneider et al. ....... | 296/26.13 |
| 6,048,016 | A * | 4/2000 | Futrell et al. ............ | 296/26.13 |
| 6,257,638 | B1 * | 7/2001 | Graber ..................... | 296/26.13 |
| 6,293,611 | B1 * | 9/2001 | Schneider et al. ....... | 296/26.14 |
| 6,415,675 | B1 * | 7/2002 | Schneider et al. ....... | 296/26.13 |
| 6,575,514 | B2 * | 6/2003 | McManus et al. ....... | 296/26.01 |
| 6,805,391 | B2 * | 10/2004 | Schneider ................. | 296/26.13 |
| 7,052,065 | B2 * | 5/2006 | Rasmussen .............. | 296/26.13 |
| 7,144,058 | B1 * | 12/2006 | Winter ..................... | 296/26.01 |
| 2002/0047286 | A1 * | 4/2002 | Nye et al. ................. | 296/26.13 |
| 2002/0060467 | A1 * | 5/2002 | McManus et al. ....... | 296/26.13 |
| 2005/0029828 | A1 * | 2/2005 | Nye et al. ................. | 296/26.01 |
| 2006/0082178 | A1 * | 4/2006 | Rasmussen .............. | 296/26.01 |
| 2006/0197358 | A1 * | 9/2006 | Franzini .................... | 296/156 |
| 2006/0232088 | A1 * | 10/2006 | Herson et al. ........... | 296/26.13 |

* cited by examiner

*Primary Examiner*—Kiran B. Patel
(74) *Attorney, Agent, or Firm*—Knobbe, Martens, Olson & Bear, LLP

(57) ABSTRACT

A recreational vehicle comprising a vehicle frame having a plurality of wheels and a coach having a slide-out mounted on the vehicle frame is disclosed herein. In particular, the recreational vehicle comprises an improved slide-out mechanism for deploying and retracting slide-out structures from the coach of the recreational vehicle. In one aspect, the recreational vehicle may comprise an armature having a fixed member with a roller and a guiding channel mounted to the vehicle frame and a rail member slidably positioned within the fixed member so as to contact the roller, wherein the rail member is adapted to telescopically extend from the fixed member through the guiding channel so as to deploy and retract the slide-out. Also, the recreational vehicle may further comprise an actuator assembly having a first gearing mechanism displaced from the roller a first distance and housed within the guiding channel so as to contact the rail member at the first distance, wherein the first gearing mechanism can be displaced from the roller at a second distance that is greater than the first distance so as to improve the weight distribution of the slide-out.

16 Claims, 13 Drawing Sheets

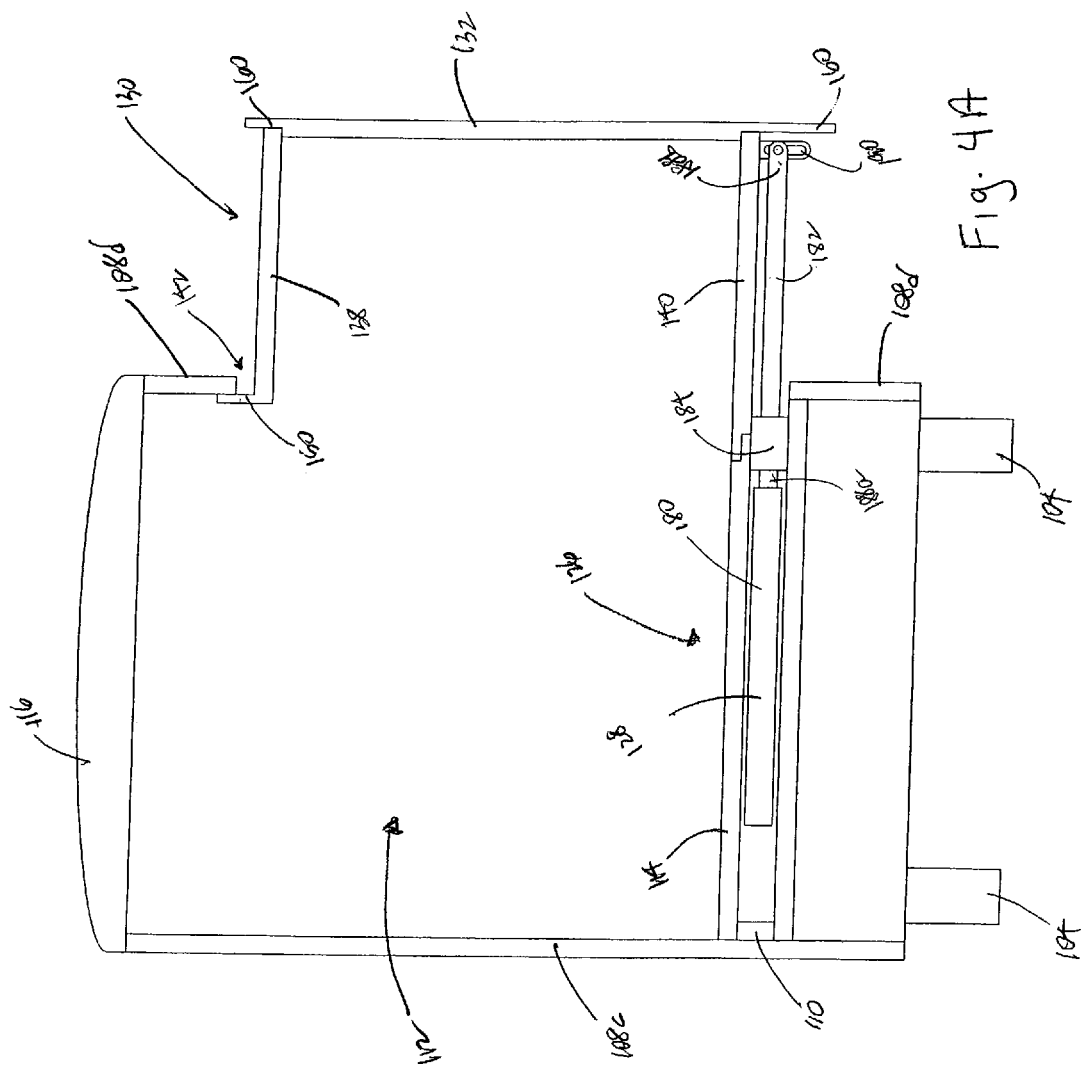

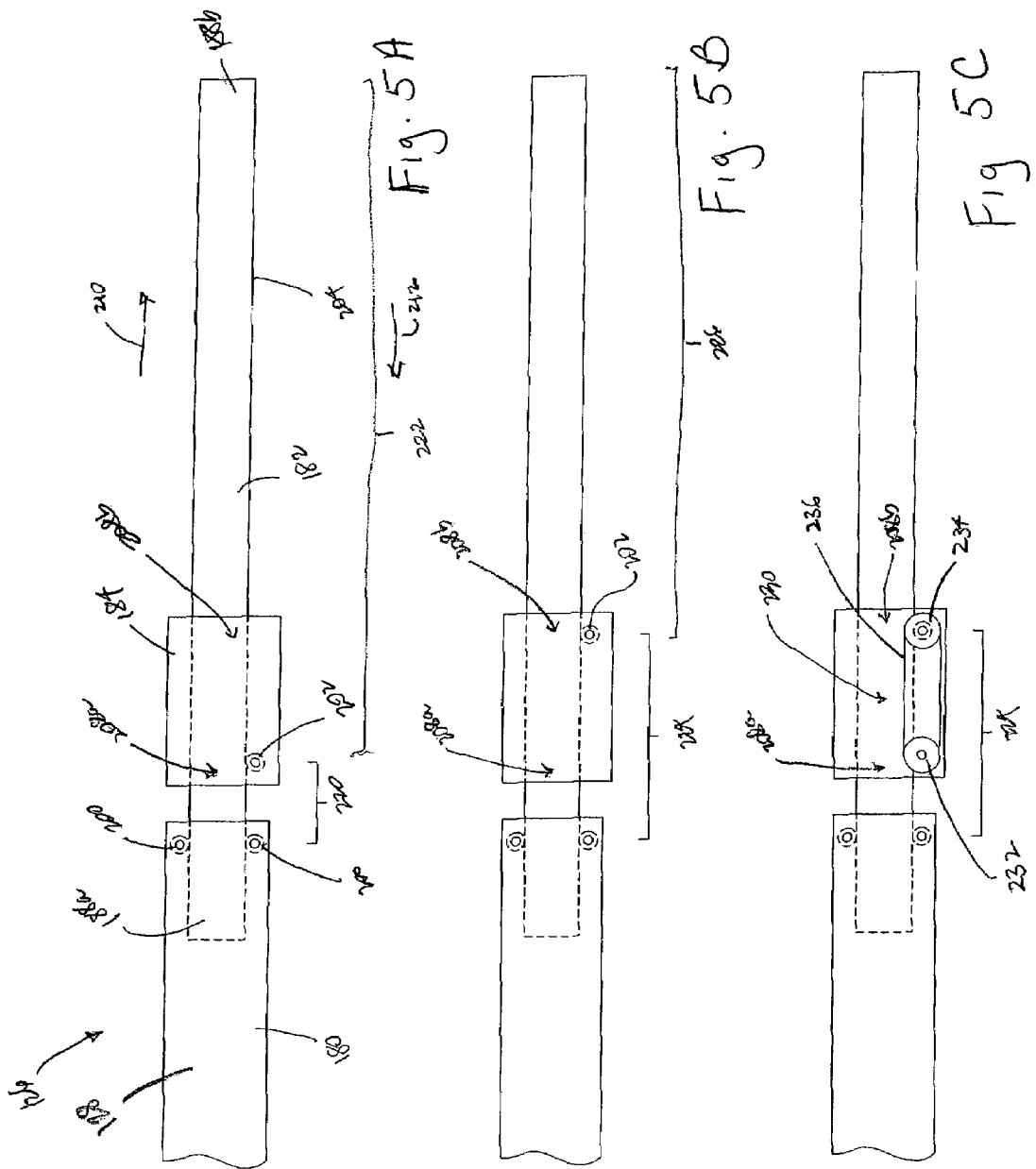

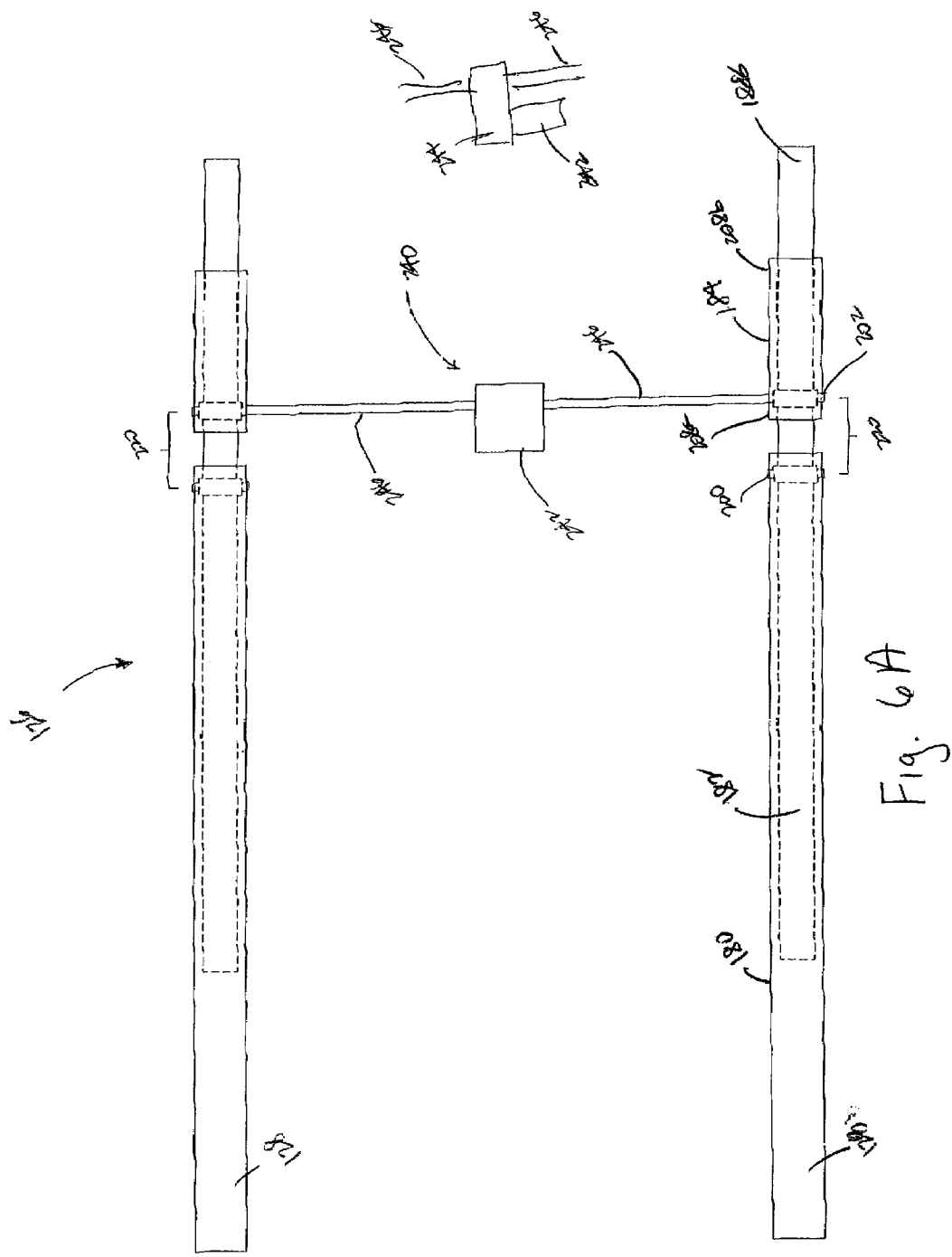

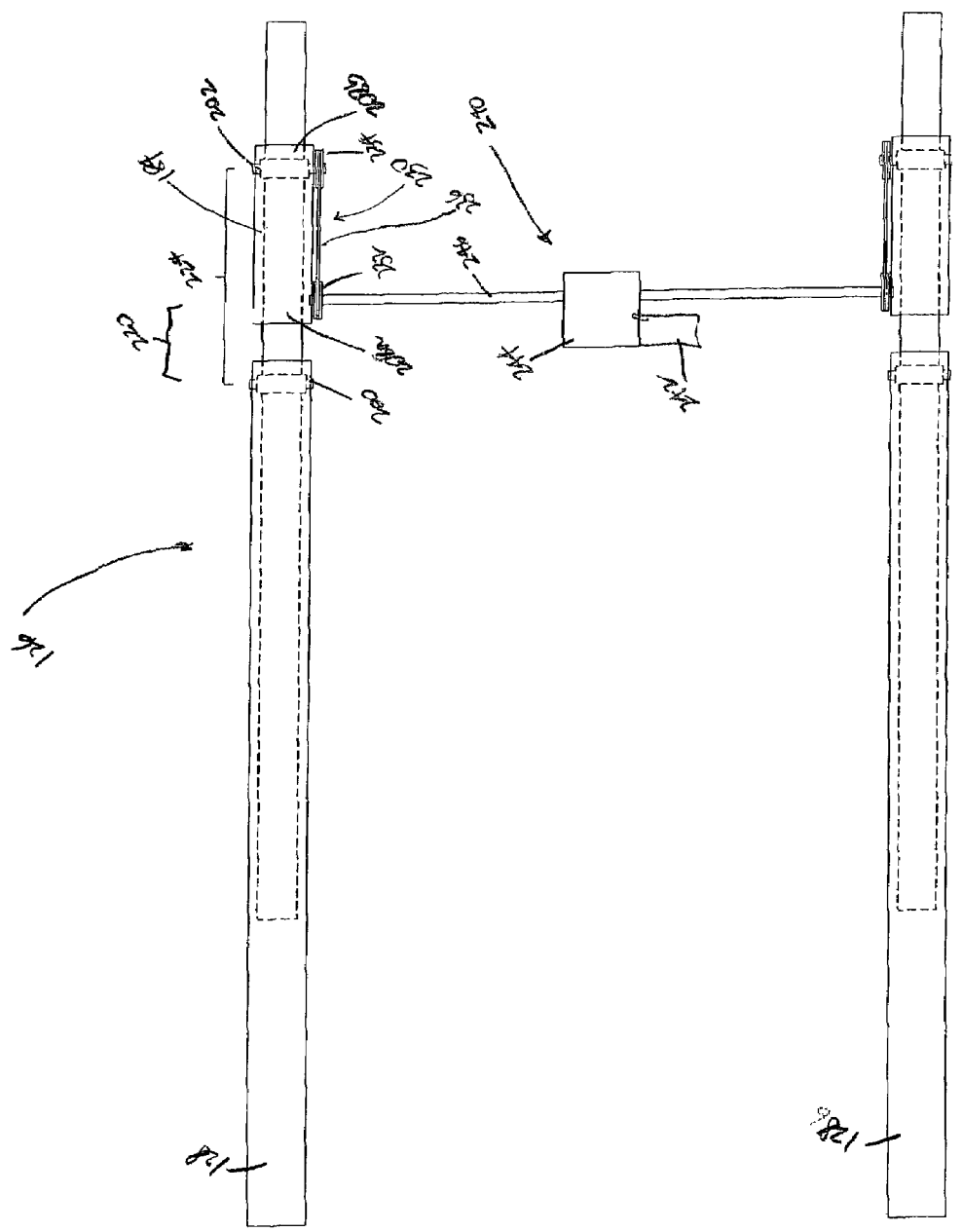

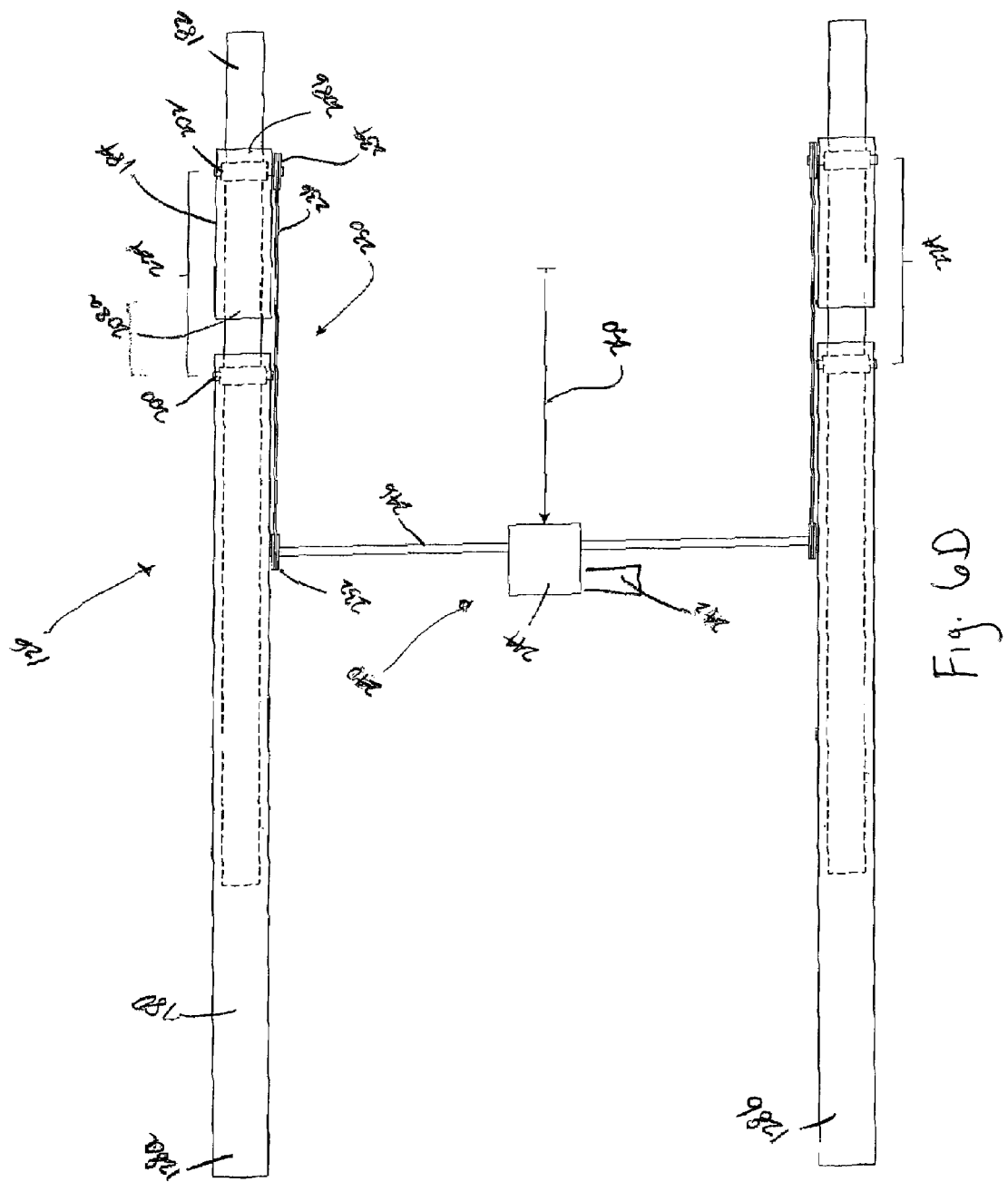

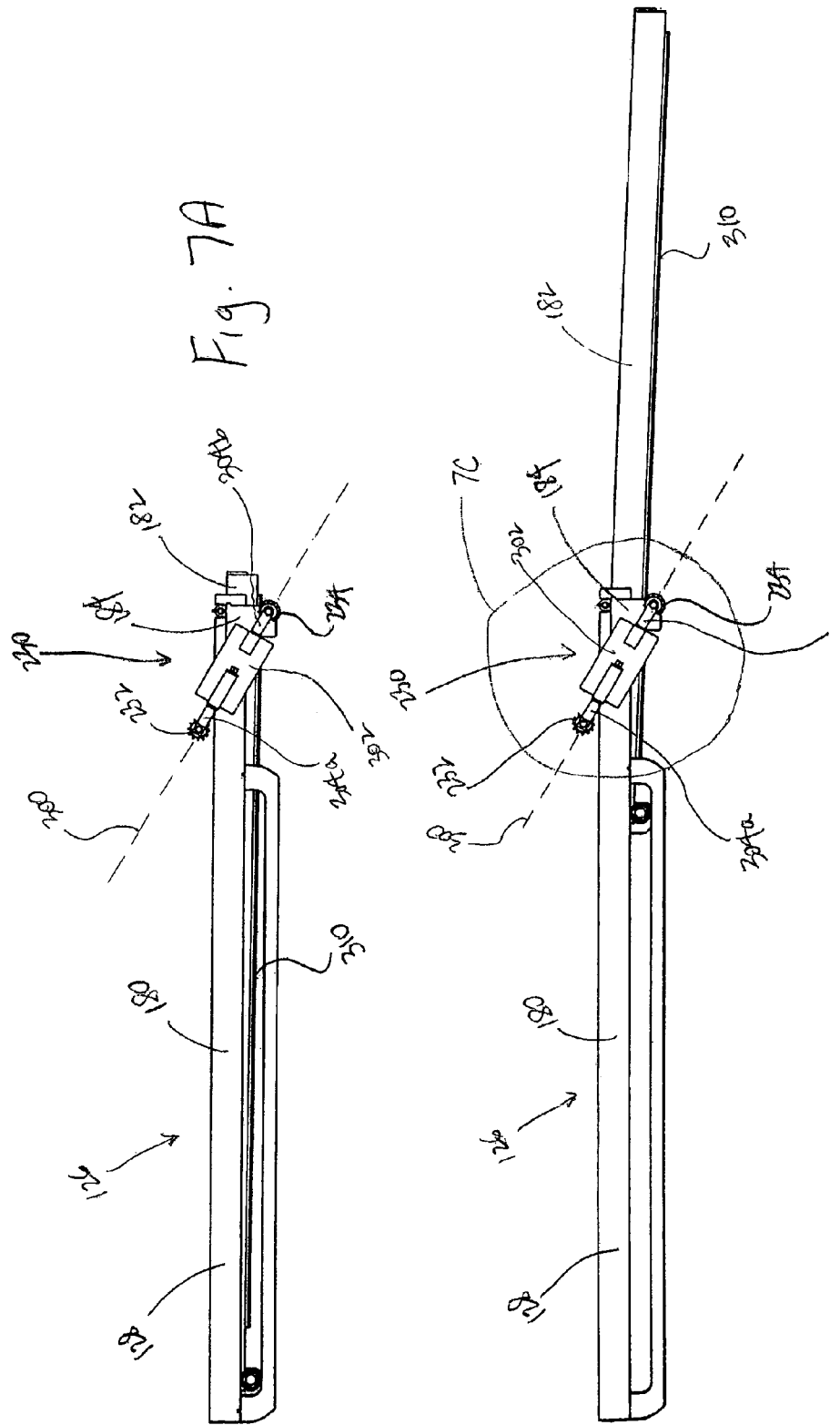

SLIDE-OUT MECHANISM FOR RECREATIONAL VEHICLES

CLAIM OF PRIORITY

This application claims the benefit of U.S. Provisional Application No. 60/645,145, filed on Jan. 19, 2005, entitled "SLIDE-OUT MECHANISM FOR RECREATIONAL VEHICLES," which is hereby incorporated by reference in its entirety.

BACKGROUND

1. Field

The present teaching relates to recreational vehicles and, in particular, relates to an improved mechanism for deploying and retracting recreational vehicle slide-outs.

2. Description of the Related Art

Recreational vehicles are becoming increasingly popular with people who wish to retain the comforts and conveniences of home while spending extended periods of time away from home at remote locations. In more elaborate configurations, the recreational vehicle typically includes interior living areas with amenities and convenience fixtures, such as a bedroom area with a bed and wardrobe closet, a bathroom area with a sink, a flushing toilet, a shower, and a washing machine, a kitchen with a refrigerator, stove, and galley sink, and a generously sized living area with reclining chairs and an entertainment center. Also, a recreational vehicle may be easily parked at a wide variety of locations so that users may enjoy the amenities of the vehicle at their favorite destination. Consequently, people who use recreational vehicles may usually be assured of a comfortable living environment at their preferred remote destination without having to rely on the availability of suitable hotels.

In response to consumer demand, manufacturers have developed increasingly larger recreational vehicles. In particular, manufacturers have developed recreational vehicles with one or more extendable structures, commonly referred to as slide-outs, that provide the user with a supplemental living space when the vehicle is parked in a suitable location. The extendable structure is adapted to extend into a deployed configuration during the time that the vehicle is parked so that the interior living space within the recreational vehicle is increased by an amount which is substantially equal to the supplemental living space of the extendable structure. The extendable structure is also adapted to retract into a retracted configuration during the time that the vehicle is in motion so that the traveling dimensions of the recreational vehicle are within the maximum allowed length and width.

The typical extendable structure or slide-out is positioned within an opening of the housing of the recreational vehicle and is comprised of a plurality of walls that form the supplemental living space therein and an opening that provides access to the supplemental living space. In general, the slide-out is deployed and retracted using extendable rails that are operated with a motor or hydraulic devices. The extendable rails are often structurally supported at a position offset from the exterior sidewall and the outer most portion of the vehicle frame. When the slide-out is deployed, the weight of the slide-out is mostly supported by the extendable rails.

Structural limitations of the vehicle frame typically restrict the position of the extendable rails such that the extendable rails have to leverage the weight of the slide-out over a short distance due to the restricted positioning of the extendable rails with respect to the vehicle frame. Unfortunately, the support structures can deform or warp over time and through excessive use, which can adversely effect the reliability of the extendable rails during deployment and retraction. Moreover, the size of the slide-out is limited by weight, wherein typical extendable rails could not support a large slide-out due to the lack of structural support for heavy slide-out structures. From the foregoing, there currently exists a need to improve the reliability of the extendable members so as to better support the slide-out when deployed and during deployment and retraction. To this end, an improved method of supporting the slide-out is further needed to allow for larger slide-out structures.

SUMMARY

The aforementioned needs may be satisfied by a recreational vehicle comprising a vehicle frame having a plurality of wheels and a coach having a slide-out mounted on the vehicle frame. In one embodiment, the recreational vehicle may comprise an armature having a fixed member with a roller and a guiding channel mounted to the vehicle frame and a rail member slidably positioned within the fixed member so as to contact the roller, wherein the rail member is adapted to telescopically extend from the fixed member through the guiding channel so as to deploy and retract the slide-out. In addition, the recreational vehicle may further comprise an actuator having a first gearing mechanism displaced from the roller a first distance and housed within the guiding channel so as to contact the rail member at the first distance, wherein the first gearing mechanism can be displaced from the roller at a second distance that is greater than the first distance so as to improve the weight distribution of the slide-out. In one aspect, the actuator may comprise a second gearing mechanism mounted to the guiding channel at the first distance.

Also, the actuator may further comprise a motor functionally coupled to the second gearing mechanism so as to communicate therewith and provide a motive force thereto. The second gearing mechanism may be functionally coupled to the first gearing mechanism so as to communicate therewith and to transfer the motive force of the motor to the first gearing mechanism. The first gearing mechanism may be adapted to receive the motive force from the second gearing mechanism and operates so as to deploy and retract the rail member from the fixed member of the armature, which results in deployment and retraction of the slide-out via the first exterior sidewall of the coach. The second gearing mechanism may be mounted to the fixed member at a selectable distance from the first gearing mechanism so as to allow the motor to be displaced from the guiding channel at the selectable distance along the length of the fixed member. The first gearing mechanism may be mounted to the guiding channel at the second distance so as to improve the weight distribution of the slide-out relative to the roller during deployment and retraction of the slide-out.

Additionally, the aforementioned needs may also be satisfied by a recreational vehicle having a vehicle frame with a plurality of wheels and a coach having a slide-out mounted on the vehicle frame. In one embodiment, the recreational vehicle may comprise a fixed member having a roller mounted to the vehicle frame and a guiding channel mounted to the vehicle frame so as to be horizontally aligned with the fixed member, a rail member slidably attached to the fixed member so as to contact the roller, wherein the rail member is adapted to distally extend from the fixed member through the guiding channel so as to deploy and retract the slide-out from and into the coach. Moreover, the recreational vehicle may further comprise a first gearing mechanism displaced from the roller a first distance and mounted to the guiding channel so as to contact the rail member at the first distance and a second gearing mechanism displaced from the roller a second distance and housed within the guiding channel so as to contact the rail member during distal extension from the fixed member to thereby improve the weight distribution of the slide-out relative to the roller during deployment and retraction of the slide-out.

Furthermore, the aforementioned needs may be satisfied with a recreational vehicle having a vehicle frame having a plurality of wheels and a coach having a slide-out mounted on the vehicle frame. In one embodiment, the recreational vehicle may comprise an armature assembly having a fixed member mounted to the vehicle frame and a rail member mounted to the slide-out and slidably positioned within the fixed member so as to telescopically extend from the fixed member to thereby deploy and retract the slide-out from and into the coach. In addition, the recreational vehicle may further comprise a guide assembly mounted to the fixed member so as to contact the rail member to thereby provide a path for the rail member to slide along during deployment and retraction of the slide-out. Moreover, the recreational vehicle may still further comprise a motor assembly having a motor, a first gearing mechanism displaced from the guide a first distance in a first direction, and a second gearing mechanism displaced from the guide a second distance in a second direction that is opposite the first direction, wherein the motor is functionally coupled to the second gearing mechanism via the first gearing mechanism so as to communicate therewith and provide a motive force to the second gearing mechanism to thereby deploy and retract the slide-out, and wherein the second gearing mechanism allows the motor to be displaced from the guide assembly a selectable distance in the second direction. These and other objects and advantages of the present invention will become more fully apparent from the following description taken in conjunction with the accompanying drawings.

BRIEF DESCRIPTION OF THE DRAWINGS

FIGS. 4A, 4B illustrate a cross sectional view of the recreational vehicle of FIG. 1.

FIGS. 5A–5C illustrates a side view of the armature assembly including one or more armature members.

FIGS. 6A–6D illustrate a top view of the armature assembly with an actuator assembly attached to a plurality of armature members.

FIGS. 7A–7C illustrate various views of another embodiment of an armature assembly.

DETAILED DESCRIPTION OF SOME EMBODIMENTS

Reference will now be made to the drawings wherein like numerals refer to like parts throughout. An improved mechanism for deploying and retracting recreational vehicle slide-outs will be described in greater detail herein below with reference to the drawings.

Figure 1:
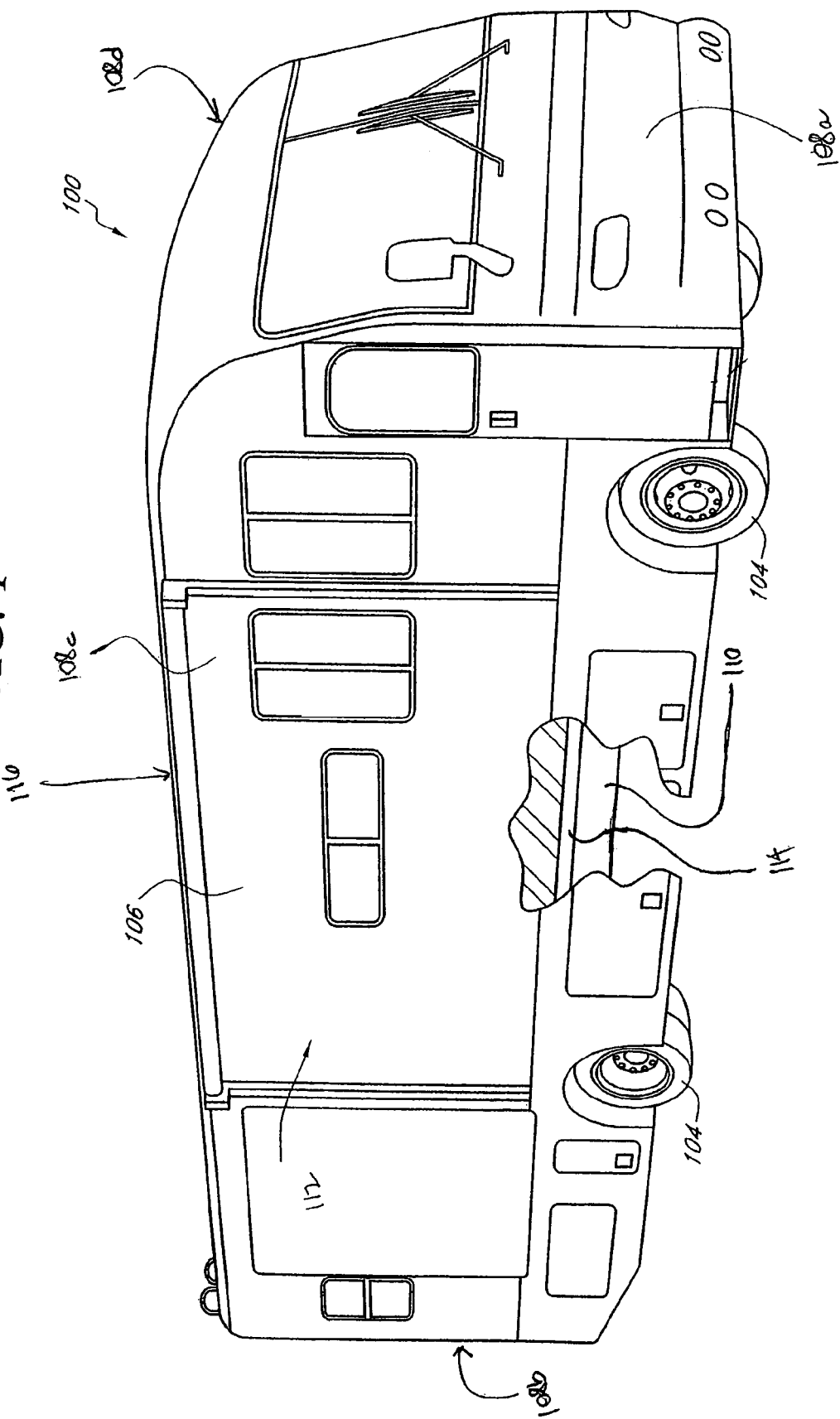
FIG. 1 illustrates one embodiment of a recreational vehicle.

FIG. 1 illustrates one embodiment of a recreational vehicle (RV) 100 having a generally rectangular chassis 102 (shown in FIG. 2) attached to a plurality of wheels 104 so as to permit rolling movement of the RV 100 over the ground. The RV 100 further comprises a coach or coach 106 that is essentially formed of a plurality of exterior planar walls 108a, 108b, 108c, 108d that are joined together and mounted to a vehicle frame 110 in a generally known manner so as to define an interior living space 112 having a coach floor 114 and coach roof 116. A horizontal axis, which is substantially parallel to the coach floor 114, extends from a front planar wall 108a of the RV 100 to a rear planar wall 108b of the RV 100. Also, the RV 100 further comprises a first fixed side wall 108c and a second fixed sidewall 108d that is positioned opposite the first fixed sidewall 108c.

As illustrated in FIG. 1, the RV 100 may comprise, for example in one embodiment, a motorhome. It should be appreciated that the RV 100 described herein represents any movable coach on wheels, such as, but not limited to, the illustrated motorhome, a fifth wheel trailer, a conventional trailer, a tent trailer, or even a cab-over camper for use with a pick-up truck. The RV 100, such as the motorhome illustrated in FIG. 1, permits occupants to travel and live inside the RV 100 in a comfortable manner. One aspect of comfort pertains to having sufficient living space within the RV 100 such that the interior living space 112 may be partitioned with interior planar walls and passageways (shown in FIG. 2) in a generally known manner so as to define interior rooms and various interior living spaces, such as a kitchen, bedroom, bathroom, etc. and generally enhance the comfort of the RV 100.

Additionally, the RV 100 may further comprise an engine, transmission, drive axle, fuel system, and electrical system of types known in the art to provide the motive power for the RV 100. The chassis 102 also facilitates mounting of relatively massive items, such as generators, air conditioners, and the like to the vehicle frame 102. As will be described in greater detail herein below with reference to FIG. 2, the vehicle frame 110 may further comprise sub-floor structural components, such as cross-supports and other various supporting members to provide strength and structural reinforcement to the planar sidewalls 108a, 108b, 108c, 108d, coach floor 112, etc.

Figure 2:
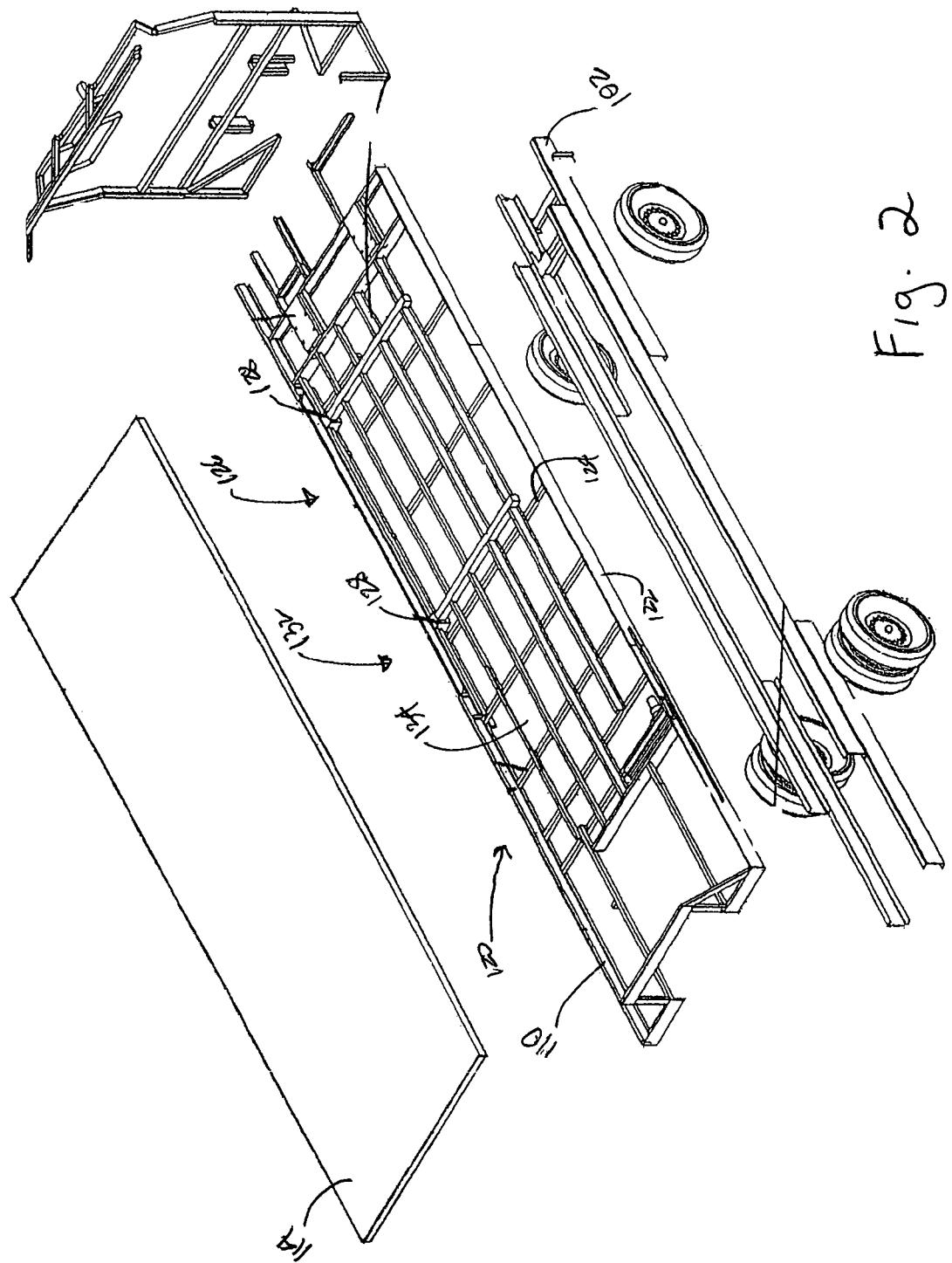
FIG. 2 illustrates an exploded view of the chassis, vehicle frame, and coach floor of the recreational vehicle of FIG. 1.

FIG. 2 illustrates an exploded view of the chassis 102, vehicle frame 110, and coach floor 114. In one embodiment, the vehicle frame 110 is mounted on the chassis 102 in a manner as described in U.S. Pat. No. 6,807,735 entitled "Method of Fabricating a Motorhome," which is hereby incorporated by reference in its entirety. The chassis 102 may comprise a split rail or raised rail chassis of a type generally known in the art. For example, the chassis 102 may comprise a diesel pusher type that is available commercially from Freightliner, LLC. of Portland, Oreg. as Model XC.

As further illustrated in FIG. 2, the vehicle frame 110 may be formed of a plurality of structural support members 120 that are arranged and joined together so as to define a substantially rectangular planar floor section 132. In one embodiment, the structural members 120 may comprise elongate support members 122 that extend along the length of the RV 100 and substantially parallel to the chassis 102. Also, the structural members 120 may further comprise cross-support members 124 that extend between and substantially perpendicular to the elongate support members 122. The structural members 120 may be distally spaced apart so as to define cavity regions 134 between structural members 120.

In addition, the structural support members 110 may further comprise an armature assembly 126 having one or more armature members 128 that function to retract and deploy a slide-out 130 (shown in FIG. 3). As illustrated, the one or more armature members 128 of armature assembly 126 are mounted to the vehicle frame 110 in a substantially parallel manner. Further detailed explanation related to the structural support members 120, 122, 124, 126 and construction of the vehicle frame 110 are more fully disclosed in U.S. Pat. No. 6,807,735 entitled "Method of Fabricating a Motorhome."

In one embodiment, the coach floor 114 may be mounted to the planar floor section 132. The coach floor 114 may comprise a plurality of rectangular pieces of plywood that are placed so as to abut each other in a coplanar fashion to thereby form a substantially planar, rectangular flooring structure. Also, the coach floor 114 may be placed directly on the vehicle frame 110 and attached to the vehicle frame 100 via a plurality of screws and adhesive in a generally known manner. Additionally, it should be appreciated that the coach floor 114 provides a continuous flooring surface for the RV 100 to support occupants and furniture in the interior living space 112 of the RV 100. Moreover, the coach floor 114 may also provide a support and attachment flooring surface for padding, carpeting, tile, linoleum, or various other interior floor finishings.

Figure 3A:
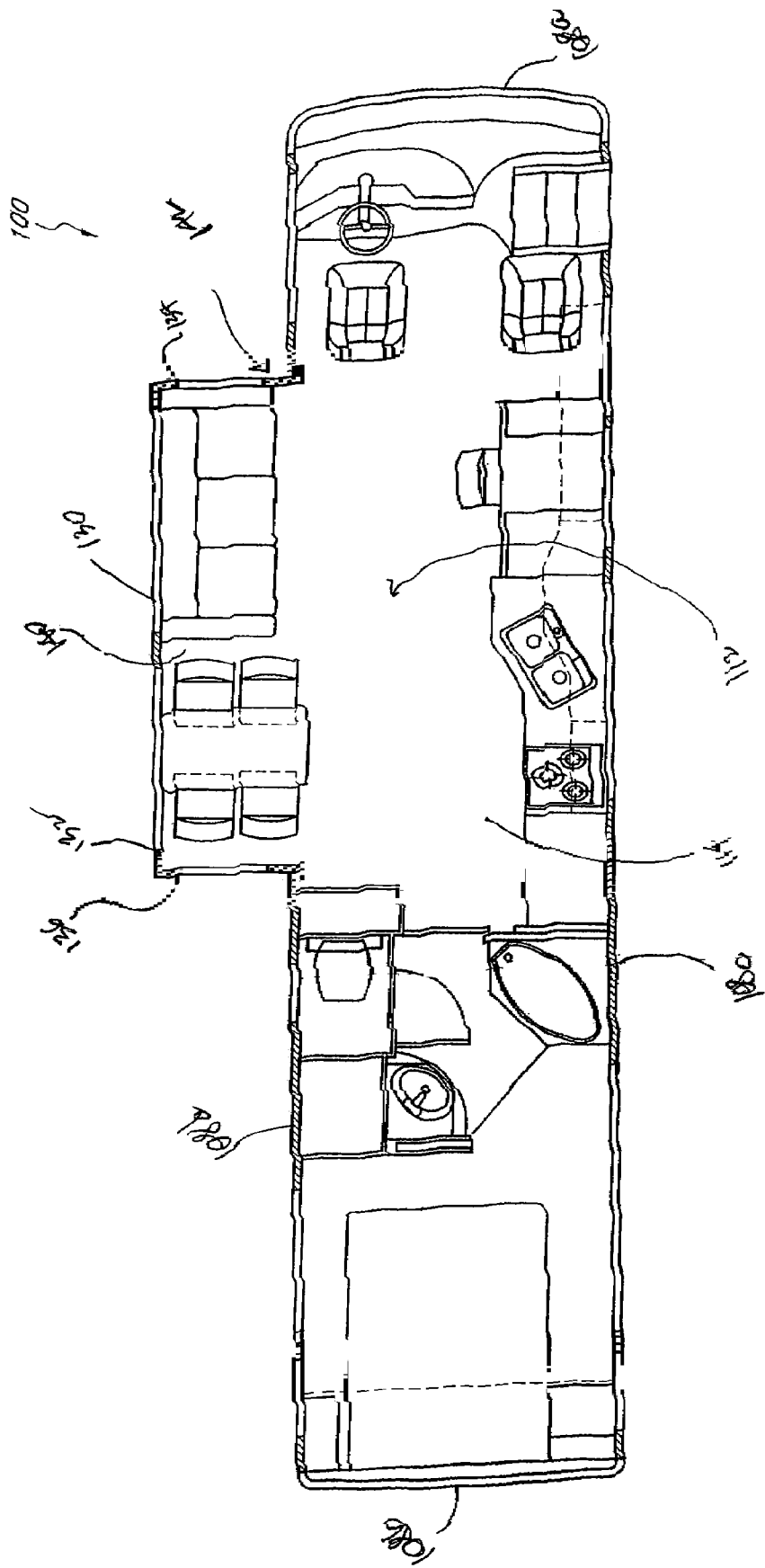
FIGS. 3A, 3B illustrate one embodiment of a detailed plan view of the interior living space within the recreational vehicle of FIG. 1.
Figure 3B:
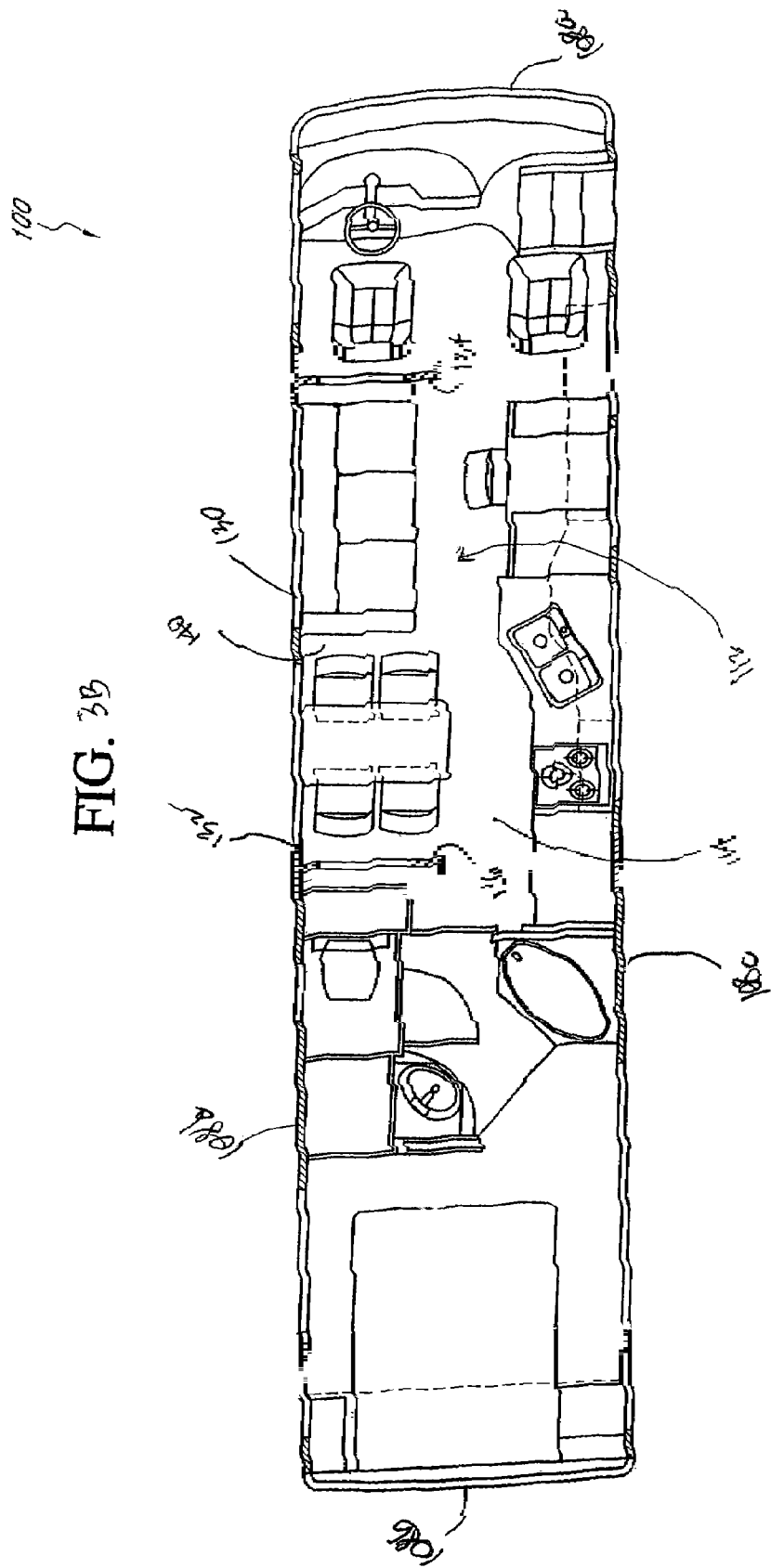

FIGS. 3A, 3B illustrate one embodiment of a detailed plan view of the interior living space 112 within the RV 100 of FIG. 1. It will be appreciated that the layout of the interior living space 112 as illustrated herein is simply one illustrative embodiment and that a number of variations to this layout may be made by those skilled in the art without departing from the scope of the present invention. In one aspect, the interior living space 112 may be sub-divided into separate living spaces, areas, or rooms with a plurality of interior planar sidewalls in a manner as described in U.S. Pat. No. 6,293,612 entitled "Recreational Vehicles with Expandable Room," which is hereby incorporated by reference in its entirety.

As illustrated in FIGS. 3A, 3B, the RV 100 may further comprise a slide-out 130 that may be configured to deploy and retract from the coach 106 so as to expand the interior living space 112 within the RV 100 by an amount at least as much as the area of the slide-out 130. In particular, FIG. 3A illustrates the slide-out 130 in a deployed configuration so as to effectively increase the inner living space 112 of the RV 100. FIG. 3B illustrates the slide-out 130 in a retracted configuration so as to provide the RV 100 with a more suitable size and shape for traveling on a road.

In one embodiment, the slide-out 130 is formed of a plurality of walls that joined together so as to form a supplemental living space therein as described in U.S. Pat. No. 6,293,612 entitled "Recreational Vehicles with Expandable Room." The plurality of walls include an outer vertical wall 132, a front vertical wall 134, a rear vertical wall 136, an overhead horizontal roof 138, and a lower horizontal floor 140 all of which are interconnected in a manner so as to form the slide-out 130. The overhead horizontal roof 138 functions as a supplemental slide-out roof, and the lower horizontal floor 140 functions as a supplemental slide-out floor. Moreover, when joined together in a manner to form the slide-out 130, the plurality of walls including the supplemental roof and floor, as a collective, are movable so as to slide in and out of the coach 106. When deployed, the slide-out 130 increases the inner living space 112 by an amount at least as much as the effective area comprised by the slide-out 130. When retracted, the slide-out 130 reduces the effective area of the inner living space 112.

Figure 4B:
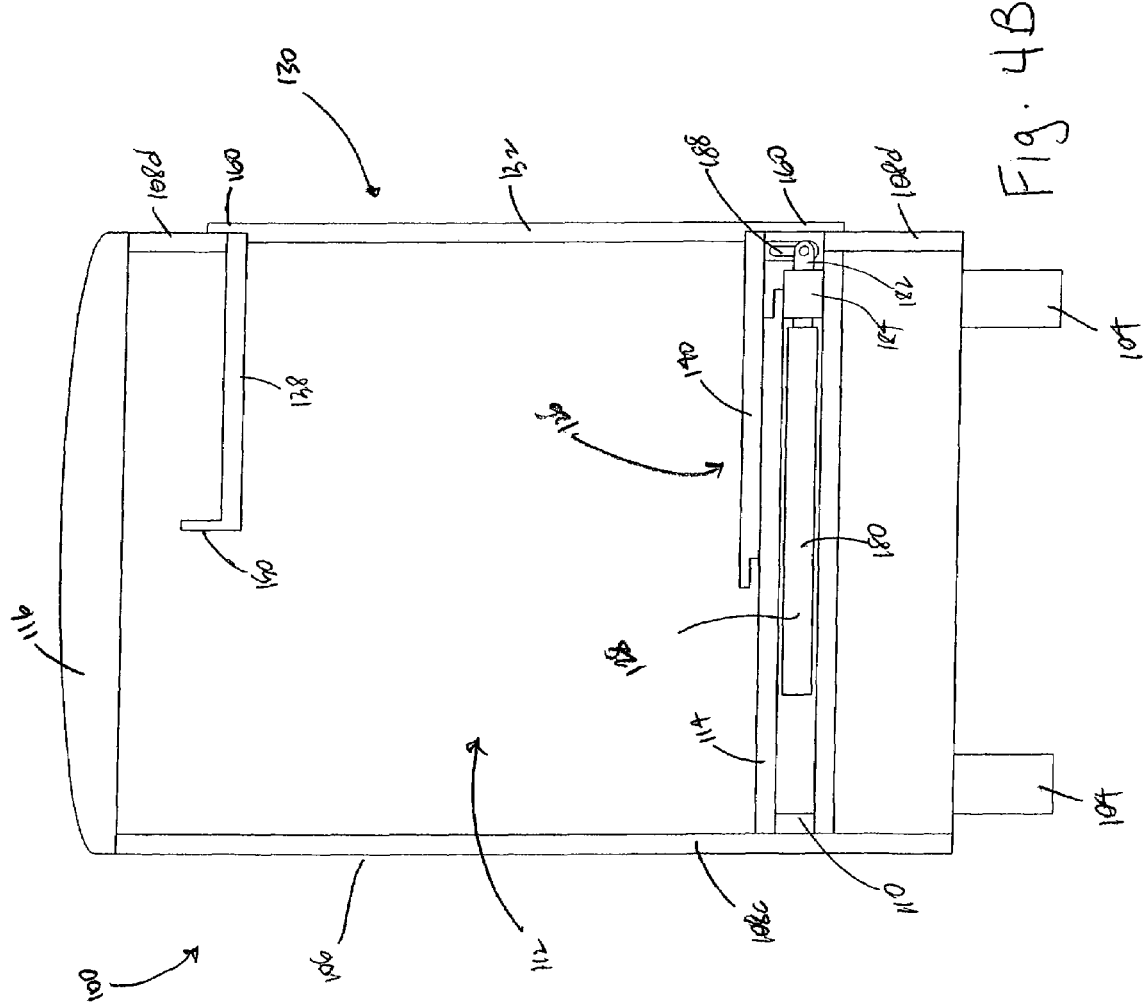

FIGS. 4A, 4B illustrate a cross sectional view of the RV 100 including the coach 106, the armature assembly 126 having one or more armature members 128, and the slide-out 130. Similar to FIG. 3A, FIG. 4A illustrates the slide-out 130 in the deployed configuration from the opening 142 in the fourth planar sidewall of the coach 106. Also, similar to FIG. 3B, FIG. 4B illustrates the slide-out 130 in the retracted configuration such that the slide-out 106 is retracted into the coach 106 via the opening 142. As illustrated in FIGS. 4A, 4B, the slide-out 130 is coupled to the armature assembly 126 that deploys and retracts the slide-out 112.

In one embodiment, the one or more armature members 128 each comprise a fixed member 180, a rail member 182 having first and second distal ends 188a, 188b, and a guiding channel 184. The fixed member 180 and the guiding channel 184 are mounted to the vehicle frame 110 in a generally known manner. The first distal end 188a of the rail member 182 is housed within the fixed member 182, and the second distal end 188b of the rail member 182 is attached to the slide-out 130 via an attaching component 188. The rail member 182 telescopically extends from the fixed member 180 through the guiding channel 184 so as to deploy the slide-out 130 from the coach 106 via the opening 142 in the fourth planar sidewall 108d. The rail member 182 also slidably extends within the fixed member 180 so as to retract the slide-out 130 into the coach 106 via the opening 142 in the fourth planar sidewall 108d.

It should be appreciated that the fixed member 180 may also be attached to the coach floor 114 or to the sub-floor component 124 of the vehicle frame 110 in a generally known manner without departing from the scope of the present invention. As will be described in greater detail herein below, the guiding channel 184 houses gearing components or mechanisms that may be utilized to deploy and retract the rail member 182 in and out of the fixed member 180. Further scope and functionality relating to the armature assembly 126 including the armature members 128 will be described in greater detail herein below.

Additionally, the supplemental roof 138 may comprise a first lip section 150 that abuts the fourth planar sidewall 108d of the coach 106 so that, when the slide-out 130 is deployed, the first lip section 150 prevents the slide-out 130 from falling out of the opening 142 in the fourth planar sidewall 108d. Also, the supplemental floor 140 of the slide-out 130 is substantially parallel to the coach floor 114 of the coach 106. When the slide-out 130 is deployed, the supplemental floor 140 substantially aligns with the coach floor 114 so as to form a substantially uniform flooring surface 156 between the coach 106 and the slide-out 130. Moreover, the outer vertical wall 132 of the slide-out 130 may comprise flanged edges 160 positioned adjacent to the outer perimeter of the outer vertical wall 132. The flanged edges 160 abut the fourth planar sidewall 108d of the coach 106 when the slide-out 130 is retracted. In one aspect, the flanged edges 160 of the outer vertical wall 132 function as sealing components to prevent the external environment from affecting the climate within the interior living spaces 112.

Although these particular embodiments illustrate the slide-out 130 extending from the left side of the RV 100, it can be appreciated that the slide-out 130 may be adapted by one skilled in the art to extend from the right side of the RV 100 without departing from the scope of the present invention. Also, it should be appreciated that these embodiments illustrate the slide-out 130 spanning a portion of the length of the coach 106, it should be appreciated that the slide-out 130 may be a variety of other suitable lengths depending on the particular application. Moreover, it should be appreciated that the RV 100 may comprise a plurality of slide-outs 130 that extend from one or more of the exterior planar sidewalls 108a, 108b, 108c, 108d without departing from the scope of the present invention.

FIGS. 5A–5C illustrate a side view of the armature assembly 126 including the one or more armature members 128. As illustrated, the fixed member 180 further comprises one or more roller supports 200 that are adapted to contact the rail member 182 in a slidable manner. The guiding channel 184 comprises front and rear sections 208a, 208b. In one embodiment, the guiding channel 184 further comprises a gearing component 202 mounted to the front section 208a. The gearing component 202 can be used to telescopically extend the rail member 182 from the fixed member 180 through the guiding channel 184 so as to deploy and retract the slide-out 130. The rail member 182 further comprises a gearing surface 204 that is adapted to receive the gearing component 202. The gearing component 204 is part of an actuator assembly that will be described in greater detail herein below with reference to FIGS. 6A–6D. In one embodiment, the gearing component 202 rotates to distally extend the rail member 182 from the fixed member 180 in a first direction 210. Also, the gearing component 202 rotates to distally extend the rail member 182 within the fixed member 180 in a second direction 210 that is substantially opposite the first direction.

In general, the weight of the slide-out 130 rests on the rail member 182. The rail member 182 is supported by the one or more support rollers 200 and the gearing component 202. Therefore, a bulk of the weight of the slide-out 130 is supported by the one or more support rollers 200 and the gearing component 202. In one embodiment, as illustrated in FIG. 5A, the gearing component 202 is displaced from the one ore more roller supports 200 a first length 220, which may be approximately 8 inches in length. During deployment of the slide-out 130, the rail member 182 is distally extended from the fixed member 180 approximately 58 inches and the gearing component 202 serves as a fulcrum that supports the weight of the slide-out 130. As illustrated, the gearing component 202 is interposed between the roller supports 200 and the second distal end 188b of the rail member 182. As a result, a second length 222 of approximately 50 inches is established between the gearing component 202 and the second distal end of the rail member 182.

In one aspect, when deployed, most of the weight of the slide-out 130 is bearing down on the second distal end 188b of the rail member 182. The weight of the slide-out produces a downward rotational force on the second distal end 188b of the rail member 182 about the gearing component 202, which functions as a type of pivot point. The downward rotational force is countered by the biasing force of the roller supports 200. As is generally known in the art, a static torque equation can be used to calculate the downward rotational force and the counter rotational force. Basically, the distances between components 182, 200, 202, such as the first and second lengths 220, 222, influence the weight distribution of the slide-out 130 relative to the rail member 182, the roller supports 200, and the gearing component 202. Due to the relatively short first and second lengths 220, 222, causes disproportionate leverage on the gearing component 202, which may damage the gearing component 202 and or the one or more support rollers 200.

FIG. 5B illustrates an improved armature assembly 126 with the gearing component 202 mounted to the rear section 208b of the guiding channel 184. As illustrated, the gearing component 202 is displaced from the one or more roller supports 200 a third length 224, which may be approximately 21 inches in length. Advantageously, the first length 220 is increased to the third length 224, which is approximately 13 inches greater than the first length 220. This results in a fourth length 226 between the rear section 208b mounting of the gearing component 202 and the second distal end of the rail member 182.

As illustrated FIG. 5B, the second length 222 is shortened to the fourth length 226, which is approximately 37 inches in length. Repositioning the gearing component 202 to the rear section 208b of the guiding channel 184 improves the weight distribution of the slide-out 130. The improved weight distribution is achieved by increasing the distance between the roller supports 200 and the gearing component 202 and by decreasing the distance between the second distal end 188b of the rail member 182 and the gearing component 202. Therefore, less downward rotational force is acting on the second distal end 188b of the rail member 182 resulting in less counter rotational force acting on the roller supports 200.

FIG. 5C illustrates a side view of the armature assembly 126 of FIG. 5B with the addition of a torque transfer assembly 230 mounted to the guiding channel 184. The torque transfer assembly 230 comprises a first gear 232 mounted to the front section 208a of the guiding channel 184, a second gear 234 mounted to the rear section 208b of the guiding channel 184, and a flexible chain 236 that forms a closed loop around the first and second gears 232, 234. The second gear 234 is further mounted to the gearing component 202 that is housed, in one embodiment, within the guiding channel 184. In addition, the torque transfer assembly 230 may be mounted to the guiding channel 184 in a manner such that the first and second gears 232, 234 are aligned in a common vertical plane and the appropriately sized chain 236 is positioned so as to surround and engage both the first and second gears 232, 234.

In one aspect, when a torque is applied to the first gear 232, the tension of the chain 236 will increase in an asymmetrical manner so that a torque is transferred to the gearing component 202 via the second gear 234. Moreover, in one aspect, the diameters of the first and second gears 232, 234 are substantially similar so as to maintain the same angular velocity during rotation. Further scope and functionality of the torque transfer assembly 230 will be described in greater detail herein below with reference to FIGS. 6A–6D.

Figure 6B:
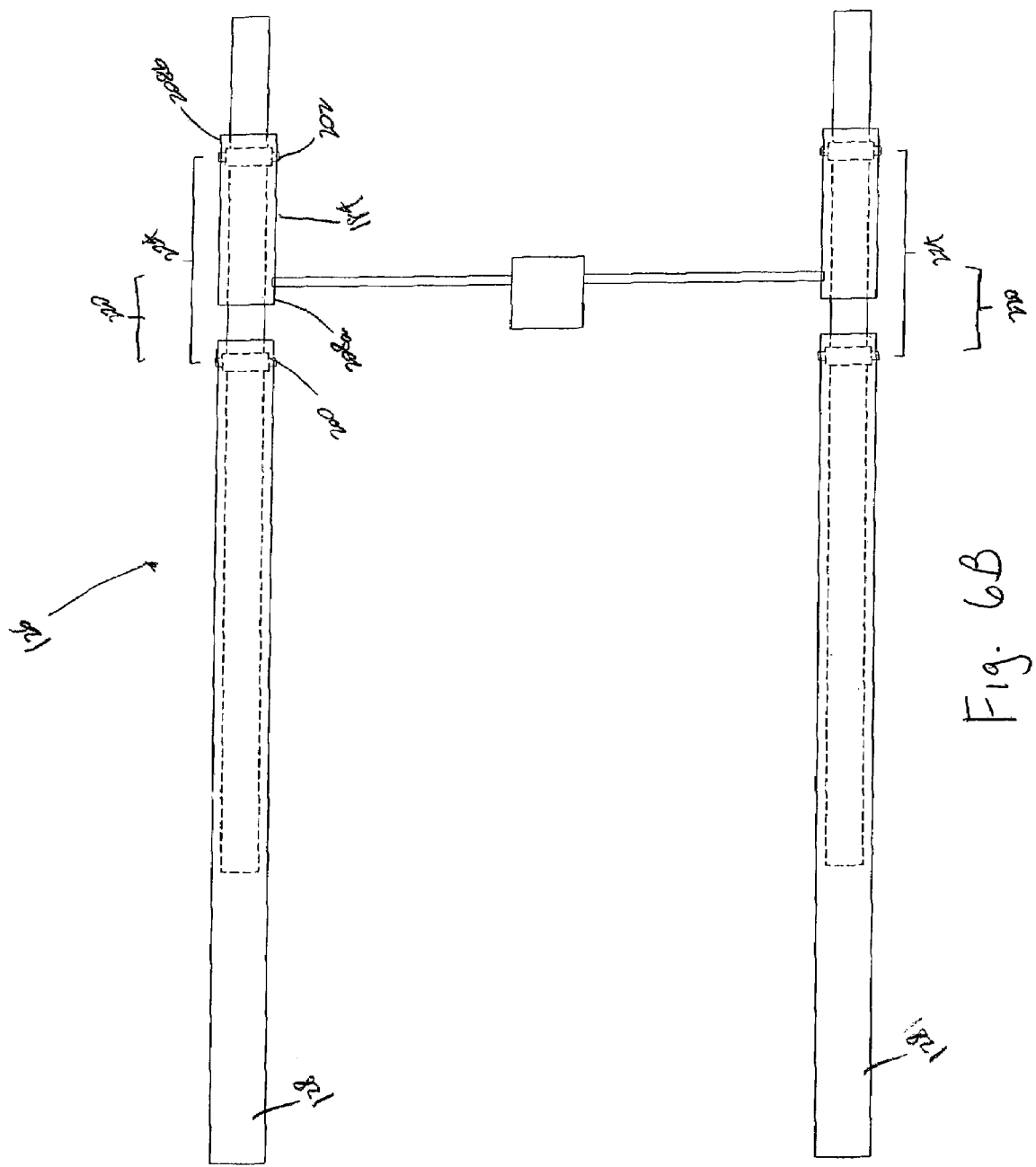

FIGS. 6A–6D illustrate a top view of the armature assembly 126 with an actuator assembly 240 attached to a plurality of armature members 128. In particular, FIG. 6A illustrates a top view of the armature assembly 126 of FIG. 5A with the gearing component 202 mounted to the front section 208a of the guiding channel 184 of each armature member 128. FIG. 6B illustrates a top view of the armature assembly 126 of FIG. 5B with the gearing component 202 mounted to the rear section 208b of the guiding channel 184 of each armature member 128. FIG. 6C illustrates a top view of the armature assembly 126 of FIG. 5C with the torque transfer assembly 230 attached to the front and rear sections 208b of the guiding channel 184 and the rear mounted gear component 202 of each armature member 128. FIG. 6D illustrates the selective positioning of the actuator assembly 240 with respect to the armature assembly 126 and the gearing component 202.

As illustrated in FIG. 6A, the actuator assembly 240 comprises a motor 242, a drive mechanism 244, and a shaft 246. In one embodiment, the motor 242 comprises a generally known electric motor. The drive mechanism 244 comprises a generally known gear box that is adapted to transfer torque produced by the motor 242 to the shaft 246. The shaft 246 comprises an elongated steel bar that is coupled to each gearing component 202 and the drive mechanism 244 so as to communicate therewith. When activated, the motor 242 operates in a manner so as to rotate each gearing component 202, which contacts the corresponding rail member 182, to thereby deploy and retract each rail member 182 from the corresponding fixed member 180, which results in the deploying and retracting the slide-out 130.

In one embodiment, the gearing component 202 and the rail member 182 operate together similar to a rack and pinion gearing mechanism. As is generally known, rack and pinion gears are utilized to convert rotational motion into linear motion. The rotational motion produced by the motor 242 is transferred to the gearing component 202 via the drive 244 and shaft 246. The rotational motion of the gearing component 202 is transferred to the rail member 182 in a manner so as to convert the rotational motion into linear motion that is substantially perpendicular to the gearing component 202 and the shaft 246. Depending on the direction of the rotational motion produced by the motor 242, the linear motion of the rail member 182 deploys and retracts the slide-out 130 from the coach 106.

Further detailed description relating to the rack and pinion gearing assembly is more fully described in the Applicant's Issued U.S. Pat. No. 6,170,903 entitled "Travel Trailer with Expandable Two-Level Bathroom and Bedroom", which is hereby incorporated by reference in its entirety. Moreover, it should be appreciated that the rack and pinion gearing mechanism of the above-mentioned armature and actuating assemblies 126, 240 may comprise various other embodiments that are generally known in the art, such as a worm gearing mechanism or hydraulic mechanisms, without departing from the scope of the present invention. Moreover, in one embodiment, the plurality of armature assemblies 126 including the fixed members 180 and the rail members 182 are approximately 60 inches apart, but it should be appreciated that the distance between the armature members 128 may comprise any length depending on the particular application and construction need.

FIG. 6B illustrates a top view of the armature assembly 126 of FIG. 5B with each gearing component 202 mounted to the rear section 208b of the guiding channels 184. As illustrated, the gearing components 202 are separated from the shaft 246 and the front section of the guiding channels 184 and repositioned and mounted to the rear section 208a of the guiding channels 184. In one embodiment, the repositioning of the gearing components 202 from the front section 208a to the rear section 208b of the guiding channels 184 increases the distance between the support rollers 200 and the gearing components 202 from the first distance 220 to the third distance 224. Advantageously, this improves the weight distribution of the slide-out 130 in a manner as previously described with reference to FIGS. 5A–5C.

FIG. 6C illustrates a top view of the armature assembly 126 of FIG. 5C with the torque transfer assemblies 230 coupled to the front and rear sections 208b of the guiding channels 184 and each rear mounted gear component 202. As illustrated, the first gear 232 of each torque transfer assembly 230 is attached to the shaft 246, which is mounted adjacent the front section 208a of each guiding channel 184.

Also, the second gear 234 of each torque transfer assembly 230 is attached to each gearing component 234, which are mounted to the rear section 208b of the guiding channels 184. Each flexible chain 236 transfers the torque of the first gear 232 to the gearing component 202 via the second gear 234 so as to deploy and retract each rail member 182 from each corresponding fixed member 180. In one embodiment, it should be appreciated that the torque produced by the motor 242 is transferred to both gearing components 202 of both actuating members 128 in a simultaneous manner so that both rail members 182 deploy and retract from each corresponding fixed member 180 at the same time.

Advantageously, FIG. 6C illustrates that the actuator assembly 240 including the motor 242, the drive 244, and the shaft 246 can maintain their respective positions relative to the armature members 128 and still operate so as to deploy and retract the rail members 182 from each corresponding fixed member 180. In addition, the torque transfer assembly 230 allows the gearing component 202 to be repositioned from the front section 208a to the rear section 208b of each guiding channel 184 without repositioning the actuator assembly 240. As a result, the weight distribution advantages of repositioning each gearing component 202 is not restricted by the position of the actuator assembly 240 due to the preserved coupling of the shaft 246 to each gearing component 202 via the torque transfer assemblies 230.

FIG. 6D illustrates the selective positioning of the actuator assembly 240 with respect to the armature members 128. In one embodiment, the length of the flexible chain 236 can be adapted to accommodate the selective positioning of the actuator assembly 240 along the length of the armature members 128. Therefore, for example, the actuator assembly 240 can be selectively displaced a variable distance 250 from the position previously described in FIG. 6C. The shaft 246 can be coupled adjacent to the fixed members 180 of each armature member 128 so as to communicate with each first gear 232 of each corresponding torque transfer assembly 230.

Figure 7C:
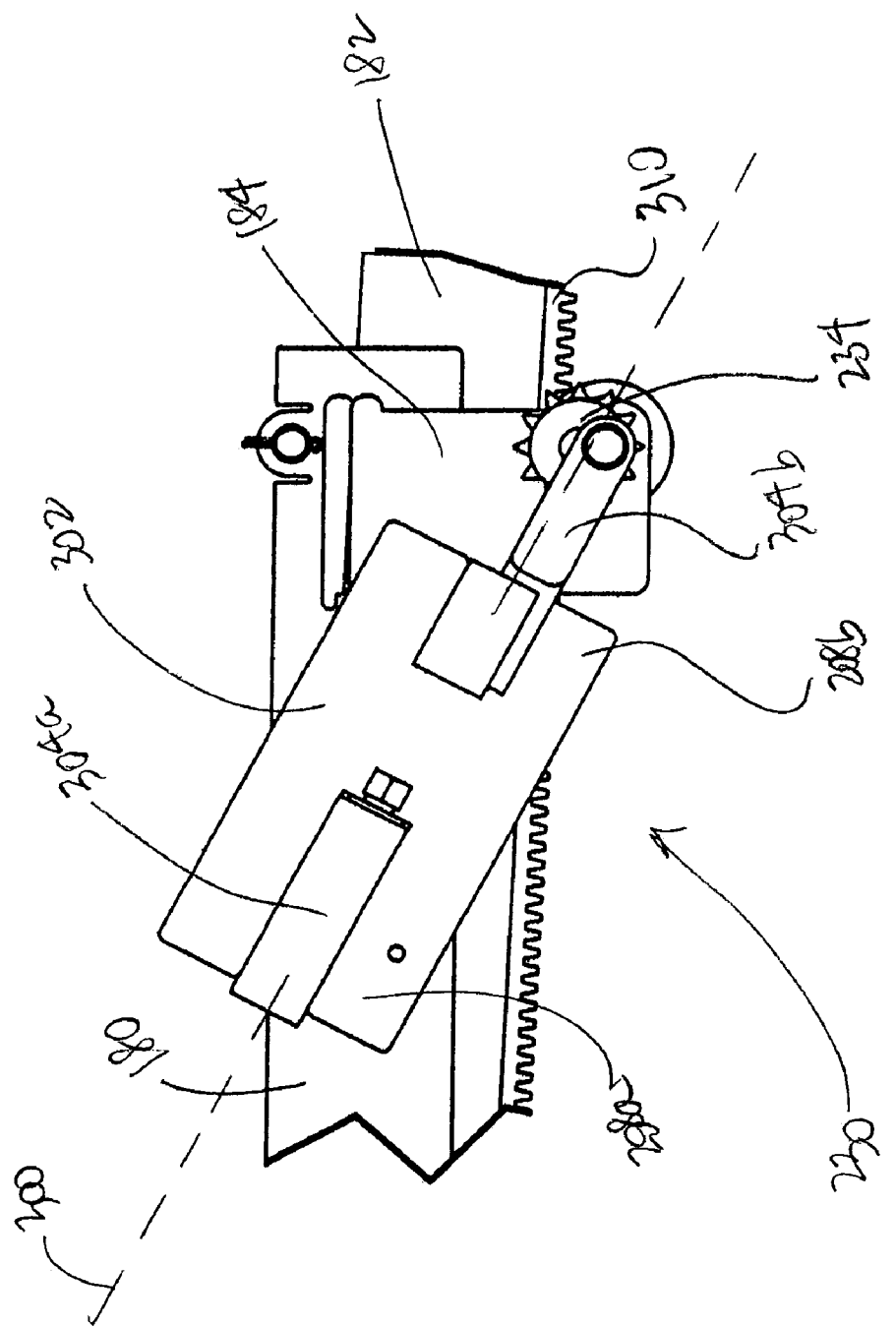

FIGS. 7A–7C illustrate a side view of another embodiment of the armature assembly 126 including the torque transfer assembly 230 the guiding channel 184, and the armature member 128. In particular, FIG. 7A illustrates the rail member 182 of the armature assembly 126 in a retracted configuration. FIG. 7B illustrates the rail member 182 of the armature assembly 126 is a deployed configuration. FIG. 7C illustrates a closer view of the torque transfer assembly 230 of FIG. 7B. In addition, the gearing components 232, 234 can be mounted to a support member 302 via extension arms 304a, 304b and are adapted to rotate thereabout. Also, the rail member 182 may comprises teeth 310 that assist with retracting and deploying the rail member 182 from the armature member 128.

In one aspect, as further illustrated in FIGS. 7A–7B, the torque transfer assembly 230 is positioned along an angular axis 300 with respect to the armature assembly 126. This allows the second gear 234 to drive the gearing component 202 so as to deploy and retract the rail member 182 in a manner, for example, as previously described. By positioning the torque transfer assembly 230 at an angular offset along the axis 300, the actuator assembly 240 the motor 242 and the gearing mechanism 244 can be positioned adjacent to the coach floor 114 of the RV 100 or between the structural support members 120 of the vehicle frame 102. This allows at least a portion of the actuator assembly 240 to be hidden underneath the main housing so as to be out of sight from passersby.

Although the foregoing description has shown, described and pointed out the fundamental novel features of the invention, it will be understood that various omissions, substitutions, and changes in the form of the detail of the apparatus as illustrated, as well as the uses thereof, may be made by those skilled in the art, without departing from the spirit or scope of the present invention. Consequently, the scope of the invention should not be limited to the foregoing discussion, but should be defined by the appended claims.

What is claimed is:

1. A recreational vehicle comprising:
a vehicle frame having a plurality of wheels;
a coach having a slide-out mounted on the vehicle frame;
an armature assembly having a fixed member with a roller and a guiding channel having a front section located proximate the roller and a rear section located distally from the roller mounted to the vehicle frame and a rail member slidably positioned within the fixed member so as to contact the roller, wherein the rail member is adapted to telescopically extend from the fixed member through the guiding channel so as to deploy and retract the slide-out; and
an actuator assembly having a first gearing mechanism displaced from the roller and housed within the guiding channel adjacent the rear section so as to contact the rail member at a distance selected improve the weight distribution of the slide-out.

2. The recreational vehicle of claim 1, wherein the coach comprises a plurality of exterior sidewalls including a first exterior sidewall mounted on the vehicle frame so as to define a main living space having a main floor.

3. The recreational vehicle of claim 2, wherein the slide-out comprises a plurality of interior sidewalls mounted in the first exterior sidewall of the coach so as to define an extendable living space having an extendable floor.

4. The recreational vehicle of claim 3, wherein the fixed member of the armature assembly is mounted to the vehicle frame adjacent to the main floor of the coach.

5. The recreational vehicle of claim 4, wherein the rail member is mounted to the extendable floor of the slide-out assembly.

6. The recreational vehicle of claim 5, wherein the guiding channel is mounted to the vehicle frame between the fixed member and the first exterior sidewall.

7. The recreational vehicle of claim 6, wherein the rail member is adapted to deploy and retract the slide-out assembly from the first exterior sidewall of the coach.

8. The recreational vehicle of claim 7, wherein the roller is housed within the fixed member so as to contact the rail member to thereby provide a path for the rail member to slide along during deployment and retraction of the slide-out.

9. The recreational vehicle of claim 1, wherein the first gearing mechanism is positioned along an angular axis with respect to the actuator assembly.

10. The recreational vehicle of claim 1, wherein the actuator assembly comprises a second gearing mechanism mounted to the guiding channel at a first distance that is less than the selected distance.

11. The recreational vehicle of claim 10, wherein the actuator assembly comprises a motor 244 functionally coupled to the second gearing mechanism so as to communicate therewith and provide a motive force thereto.

12. The recreational vehicle of claim 11, wherein the second gearing mechanism is functionally coupled to the first gearing mechanism so as to communicate therewith and to transfer the motive force of the motor to the first gearing mechanism.

13. The recreational vehicle of claim 12, wherein the first gearing mechanism receives the motive force from the second gearing mechanism and operates so as to deploy and retract the rail member from the fixed member of the armature assembly, which results in deployment and retraction of the slide-out via the first exterior sidewall of the coach.

14. The recreational vehicle of claim 13, wherein the second gearing mechanism is mounted to the fixed member at a selectable distance from the first gearing mechanism so as to allow the motor to be displaced from the guiding channel at the selectable distance along the length of the fixed member.

15. The recreational vehicle of claim 10, wherein second gearing mechanism is positioned along an angular axis with respect to the actuator assembly.

16. The recreational vehicle of claim 1, wherein the first gearing mechanism is mounted to the guiding channel at the second distance so as to improve the weight distribution of the slide-out relative to the roller during deployment and retraction of the slide-out.

* * * * *